(12) United States Patent
Schaum et al.

(10) Patent No.: US 6,935,487 B2
(45) Date of Patent: Aug. 30, 2005

(54) ADJUSTABLE LENGTH CONVEYOR BED

(75) Inventors: Frank-Peter Schaum, Grand Rapids, MI (US); Michael T. McGettigan, Muskegon, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

(21) Appl. No.: 10/704,451

(22) Filed: Nov. 7, 2003

(65) Prior Publication Data

US 2004/0094391 A1 May 20, 2004

Related U.S. Application Data

(60) Provisional application No. 60/424,421, filed on Nov. 7, 2002.

(51) Int. Cl.[7] .............................................. B65G 15/60
(52) U.S. Cl. ...................................... 198/812; 198/588
(58) Field of Search .................................. 198/812, 588

(56) References Cited

U.S. PATENT DOCUMENTS

| | | | |
|---|---|---|---|
| 1,041,439 A | 10/1912 | Dearborn | |
| 2,631,715 A | 3/1953 | Vickers | 198/139 |
| 2,678,125 A | 5/1954 | Bonney, Jr. | 198/139 |
| 2,815,849 A | 12/1957 | Zumbrunnen | 198/139 |
| 2,826,290 A | 3/1958 | Barski | 198/139 |
| 3,216,552 A | 11/1965 | Lister, Jr. | 198/139 |
| 3,788,452 A | 1/1974 | McWilliams | 198/139 |
| 3,825,107 A | 7/1974 | Cary et al. | 198/139 |
| 3,878,937 A | 4/1975 | Glaser et al. | 198/203 |
| 4,146,126 A | 3/1979 | Mattos | 198/862 |
| 4,172,677 A | 10/1979 | Gunti | 403/189 |
| 4,399,908 A | 8/1983 | Gunti | 198/789 |
| 4,643,299 A | 2/1987 | Calundan | 198/812 |
| 5,046,603 A | 9/1991 | Odenthal | 198/812 |
| 5,224,584 A | 7/1993 | Best et al. | 198/782 |
| 5,307,917 A | 5/1994 | Hall | 198/313 |
| 5,351,809 A | 10/1994 | Gilmore et al. | 198/812 |
| 5,456,348 A | 10/1995 | Whetsel et al. | 198/812 |
| 5,487,462 A | 1/1996 | Gilmore | 198/594 |
| 5,490,592 A | 2/1996 | Best et al. | 198/812 |
| 5,685,416 A | 11/1997 | Bonnet | 198/812 |
| 5,762,178 A | 6/1998 | Tarlton | 198/860.2 |
| 5,797,481 A | 8/1998 | Uber et al. | 198/813 |
| 5,850,903 A | 12/1998 | Walters | 198/588 |
| 6,003,658 A | 12/1999 | Best et al. | 198/588 |
| 6,012,568 A | * 1/2000 | Kane | 198/817 |
| 6,035,971 A | 3/2000 | Lindstrom et al. | 186/61 |
| 6,247,581 B1 | * 6/2001 | Oswald et al. | 198/812 |
| 6,298,981 B1 | 10/2001 | Hosch et al. | 198/813 |
| 6,571,938 B2 | 6/2003 | Gilmore | 198/812 |
| 6,619,473 B2 | 9/2003 | Romeo | 198/836.1 |

FOREIGN PATENT DOCUMENTS

| | | |
|---|---|---|
| DE | 3340322 | 5/1985 |
| EP | 1172311 | 1/2002 |
| FR | 2700157 | 7/1994 |
| GB | 1135791 | 12/1968 |
| WO | 9731845 | 9/1997 |

* cited by examiner

*Primary Examiner*—James R. Bidwell
(74) *Attorney, Agent, or Firm*—Van Dyke, Gardner, Linn & Burkhart, LLP (57) ABSTRACT

An adjustable length conveyor bed includes conveyor sections that are movably positioned relative to one another and that include at least one belt support or roller at an upper portion of the respective sidewalls. A fixed roller support is mounted to one section and has a fixed roller rotatably mounted thereto. A continuous belt is reeved along a belt routing path around the rollers and defines a conveying surface at and along the support rollers. A guide roller is movable with the other section and relative to the fixed roller to maintain a generally constant tension in the belt as the conveyor bed is adjusted. The sections are movable relative to one another and securable at a desired degree of extension by securing the other section relative to the fixed roller support.

30 Claims, 6 Drawing Sheets

ADJUSTABLE LENGTH CONVEYOR BED

CROSS REFERENCE TO RELATED APPLICATION

The present application claims priority of U.S. provisional application Ser. No. 60/424,421, filed Nov. 7, 2002 by Schaum for ADJUSTABLE LENGTH CONVEYOR BED, which is hereby incorporated by reference herein in its entirety.

FIELD OF THE INVENTION

The present invention relates generally to conveyors for article transport within a warehouse and, more particularly, to belted conveyor sections which are positionable adjacent other conveyor sections to define an article transport conveyor.

BACKGROUND OF THE INVENTION

Typically, a powered belt conveyor includes conveyor sidewalls and cross members which are cut to a predetermined length or size and welded together to manufacture the desired belt conveyor. The conveyor and conveyor sections thus are generally non-adjustable and difficult to modify should changes be required or desired in the layout of the conveyor.

Some conveyors have been proposed which bolt together to allow for changeover or modification of the conveyor. However, such conveyors typically are roller conveyors, because the bolted conveyors cannot withstand the excessive forces exerted by a continuous conveyor belt which is driven around guide rollers of a belt conveyor during operation of the belt conveyors. Such excessive forces tend to cause slippage between the fasteners and components of the conveyors. Additionally, the bolt-together conveyors of the prior art are not adjustable to adjust an overall length of the conveyor to adapt conveyor sections to different applications requiring different length sections.

Other conveyor sections have been proposed that are wheeled or portable sections for temporary positioning at a desired location for conveying articles along the conveyor section. Such movable conveyor sections are not designed to be positioned between existing conveyor sections and to remain fixedly positioned between the conveyor sections as part of the overall conveyor system at a facility or warehouse.

SUMMARY OF THE INVENTION

The present invention provides an adjustable length conveyor bed or section which may be adjusted in length to match a gap or space between two spaced apart conveyor sections.

According to an aspect of the present invention, an adjustable length conveyor bed is positionable between spaced apart conveyor sections of a transport conveyor of a warehouse. The adjustable length conveyor bed is adjustable to adjust a length of the conveyor bed to substantially span a distance between the spaced apart conveyor sections. The adjustable length conveyor bed includes first and second sections movably positioned relative to one another, a fixed roller support, a guide roller, and a continuous belt. Each of the first and second sections have opposite sidewalls, and include at least one support roller at an upper portion of the sidewalls. The fixed roller support is fixedly mounted to the first section and has an end portion that extends from the first section and toward the second section. The fixed roller support has a fixed roller rotatably mounted at the end portion. The guide roller is mounted at the sidewalls of the second section and movable with the second section relative to the first section and the fixed roller. The support rollers, the fixed roller and the guide roller define a belt routing path. The continuous belt is reeved around the support rollers, the fixed roller and the guide roller and along the belt routing path. An upper run of the belt defines a conveying surface at the support rollers and along the adjustable length conveyor bed. The guide roller is movable with the second section and relative to the fixed roller to maintain a generally constant tension in the belt as the second section is moved relative to the first section. The second section is movable relative to the first section and is securable at a desired degree of extension from the first section by securing the sidewall of the second section relative to the fixed roller support.

According to another aspect of the present invention, an adjustable length conveyor bed is positionable between spaced apart conveyor sections of a transport conveyor of a warehouse. The adjustable length conveyor bed is adjustable to adjust a length of the conveyor bed to substantially span a distance between the spaced apart conveyor sections. The adjustable length conveyor bed includes an end section movably positioned at an intermediate section, which is movably positioned at an end of a fixed section, which is fixedly positioned at the warehouse. Each of the sections include at least one support roller. The conveyor bed further includes a fixed roller support, a guide roller and a continuous conveyor belt. The fixed roller support is fixedly mounted to the fixed section and extends from the end of the fixed section. The fixed roller support has a fixed roller rotatably mounted at an end portion of the fixed roller support. The guide roller is mounted at the end section and movable with the end section relative to the fixed section and the fixed roller. The support rollers, the fixed roller and the guide roller define a belt routing path. The continuous belt is reeved around the support rollers, the fixed roller and the guide roller and along the belt routing path. An upper run of the belt defines a conveying surface at the support rollers and along the adjustable length conveyor bed. The guide roller is movable relative to the fixed roller to maintain a generally constant tension in the belt as the end section and the intermediate section are moved relative to the fixed section. The end section and the intermediate section are movable relative to the fixed section and are securable at a desired degree of extension from the fixed section by securing the end section and/or the intermediate section relative to the fixed roller support.

The fixed roller support may include a channel extending at least partially therealong. The end section and/or the intermediate section may include a locking member that is slidable along the channel when the end and intermediate sections are moved relative to the fixed section. The locking member is securable in the channel to secure the end section and the intermediate section relative to the fixed roller support.

The adjustable length conveyor bed may include an adjustment mechanism that is configured to adjust the sections relative to one another to adjust a length of the conveying surface while maintaining an overall length of the belt routing path. The adjustment mechanism may adjust the sections relative to one another such that a gap defined between the end section and the intermediate section is substantially equal to a gap defined between the intermediate section and the fixed section.

In one form, the adjustment mechanism may comprise a first track extending from the end section and a second track extending from the fixed section and a rotatable member at the intermediate section. The rotatable member engages the first and second tracks and is operable to control movement of the tracks and the end and fixed sections relative to the rotatable member and the intermediate section via rotation of the rotatable member.

In another form, the adjustment mechanism may comprise a plurality of linkages. Each of the linkages is pivotally connected to at least two other of the linkages. The linkages define a parallelogram assembly with a center pivot positioned at the intermediate section and opposite end pivots positioned at the end and fixed sections.

Optionally, one of the rollers, such as one of the upper or support rollers, may comprise a motorized roller having an internal motor that is operable to rotatably drive a roller portion of the roller relative to a shaft portion of the roller to drive the conveyor belt around the rollers.

The conveyor bed sections may include support rollers, slider beds and/or the like to support the continuous belt along the conveying surface of the adjustable conveyor bed.

Therefore, the present invention provides an adjustable conveyor bed or section which may be positioned between separated conveyors or conveyor sections or the like and adjusted in length to substantially abut or join the separated conveyors to provide a generally continuous conveying surface along and between the conveyors. The adjustable conveyor bed adjusts the overall length of the belt conveying surface of the conveyor bed, while substantially maintaining the overall length of the belt routing path around the rollers of the adjustable conveyor bed. The adjustable conveyor bed is expandable in a controlled manner to minimize the length of the gaps between the rollers or belt supports of adjacent portions or sections of the adjustable conveyor bed. The adjustable conveyor bed is securable to substantially secure or fix the movable sections at the desired degree of extension to substantially secure or fix the adjustable conveyor bed at the desired length. The adjustable conveyor bed of the present invention thus may accommodate different sized gaps or spaces between conveyor sections and avoids the need for manufacturing different conveyor sections to accommodate specified distances between spaced apart conveyor sections.

These and other objects, advantages, purposes and features of the present invention will become apparent upon review of the following specification in conjunction with the drawings.

DESCRIPTION OF THE PREFERRED EMBODIMENTS

Referring now specifically to the drawings and the illustrative embodiments depicted therein, an adjustable conveyor section or bed 10 (FIGS. 1–3) is positionable between spaced apart conveyors or conveying sections (not shown in FIGS. 1–3) of a transport system for transporting articles along the conveying sections. Adjustable conveyor bed 10 includes opposite sidewalls 12 with multiple movable sections 12a, 12b, 12d, 12e, which are movable relative to a center or fixed section 12c. Adjustable conveyor bed 10 also includes a continuous belt 14 reeved around a plurality of belt supports or upper rollers or support rollers 16, a pair of adjusting or movable rollers 18 and a pair of fixed rollers 20. Adjustable conveyor bed 10 may be adjustable between a retracted state (FIG. 1) and an extended state (FIG. 2) to adjust a length of a belt conveying surface 14a of the adjustable conveyor bed 10 to adapt the section to substantially span the gap between the spaced apart conveying sections of the transport system. The adjusting rollers 18 and fixed rollers 20 cooperate to adjust the length of the belt routing path of continuous belt 14 as the sidewalls 12 and conveying surface 14a are extended or retracted, as discussed below. An adjusting device or mechanism 22 is positioned along conveyor bed 10 and is configured to control extension and retraction of the conveyor sections 12a, 12b, 12d, 12e relative to center section 12c and to one another, as also discussed below.

Adjustable conveyor bed 10 may be positioned between spaced apart conveyor sections or conveyors, such as an upstream conveyor section and a downstream conveyor section. The adjustable conveyor bed and adjacent conveyor sections form part of a transport conveyor system at a warehouse or facility for conveying or transporting articles along the conveying surfaces of the conveyor sections. Adjustable conveyor bed 10 may be fixedly positioned between the conveyor sections such that center section 12c is substantially fixed or non-movable relative to the warehouse floor and/or other conveyor sections. One or both of the opposite end sections may be moved or extended from the center section to generally abut the adjacent upstream or downstream conveyor section.

Upper rollers 16 are positioned along sidewalls 12 to support the belt 14 and define the conveying surface 14a along the upper portion or surface of adjustable conveyor bed 10. The upper rollers 16 may be mounted to sidewalls 12 via any known methods, such as non-rotatably mounting the shaft ends into or through correspondingly formed openings 13 in sidewalls 12, as is known in the art. Upper rollers 16 include an end roller 16a at each end of the end sections 12a, 12e of conveyor bed 10, whereby the end rollers 16a are movable relative to one another as the conveyor bed is extended or retracted, as can be seen with reference to FIGS. 1 and 2. Upper rollers 16 may also include one or more support rollers 16b positioned along one or more of the sections 12a–e to provide support for the belt 14 along conveying surface 14a. Each of the sections 12a–e may include at least one upper roller 16 so that support for the belt 14 is provided along the adjustable conveyor bed 10, as discussed below. Optionally, the sections may include slider beds or the like between the upper end rollers 16a and/or between other upper rollers 16b positioned along the adjustable conveyor bed to provide support of the belt along the adjustable conveyor bed or section, without affecting the scope of the present invention.

Continuous conveyor belt 14 is reeved over upper rollers 16 and around end rollers 16a and reeved or reversed around adjusting rollers 18 and fixed rollers 20. One of the rollers 16, 18, 20, such as one of the end rollers 16a (such as a downstream end roller), may be driven to move or drive belt 14 around the rollers and along the conveying surface to convey or transport articles along the adjustable conveyor bed. Optionally, one of the rollers may comprise a motorized or self-driven roller 17 for driving the conveyor belt around the rollers to convey articles along the adjustable conveyor bed 10. The motorized roller may be driven via a control 19 positioned at or located at the adjustable conveyor bed 10, such as at one of the sidewalls 12 of adjustable conveyor bed 10. Control 19 may be operable to activate and deactivate motorized roller 17 to selectively convey and accumulate articles along and on the conveying surface 14a of adjustable conveyor bed 10, as discussed below.

Figure 1:
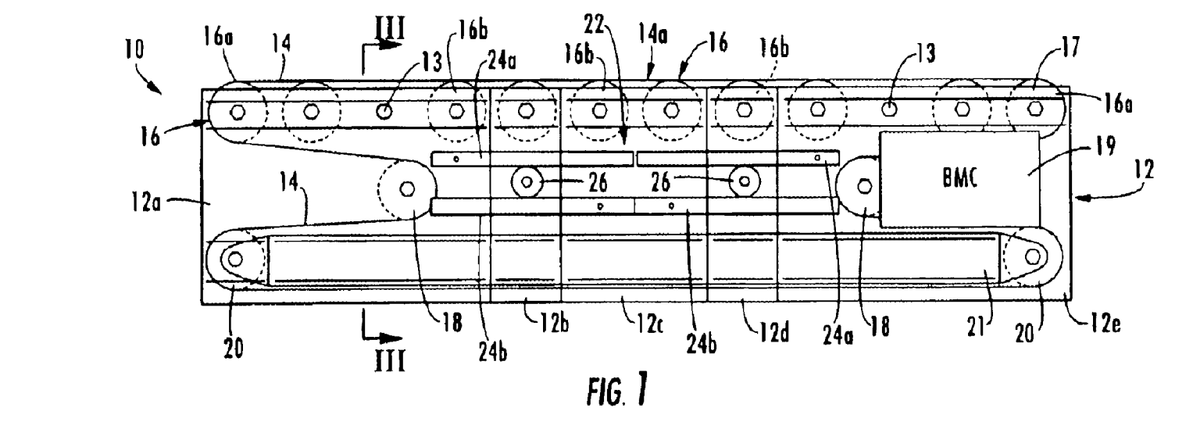
FIG. 1 is a side elevation of an adjustable length conveyor bed in accordance with the present invention, shown in its retracted state.
Figure 2:
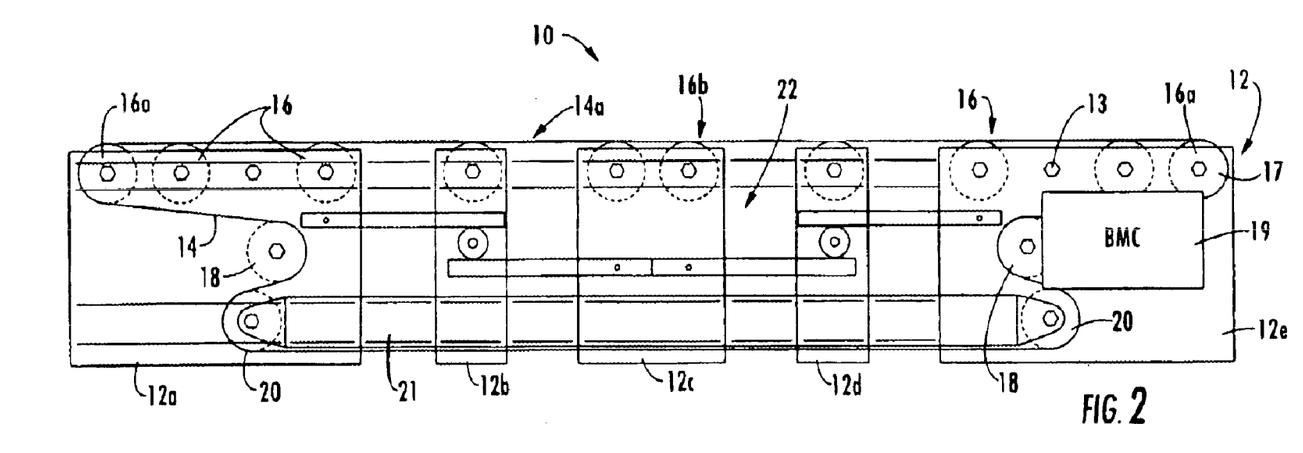
FIG. 2 is a side elevation of the adjustable length conveyor bed of FIG. 1, shown in its extended state.

Each of the movable rollers or adjusting rollers 18 is mounted to a corresponding outer or end section 12a, 12e of adjustable conveyor bed 10 and is thus movable with outer section 12a, 12e relative to inner movable sections or intermediate sections 12b, 12d and center section 12c. As shown in FIGS. 1 and 2, adjusting rollers 18 are positioned generally below upper rollers 16 and toward center section 12c from end rollers 16a.

Fixed rollers 20 are rotatably mounted at opposite ends or end portions of a mounting arm or member or support 21, which is mounted to or fixedly positioned relative to center section 12c. Accordingly, the movable sections 12a, 12b and 12d, 12e are movable between the retracted and extended positions relative to center section 12c and relative to fixed rollers 20. In the illustrated embodiment, fixed rollers 20 are positioned so as to be generally beneath the upper end rollers 16a when adjustable conveyor bed 10 is retracted, as can be seen in FIG. 1. In the retracted state or orientation, the sidewalls of the adjacent sections of the adjustable conveyor bed may generally abut one another, as shown in FIG. 1.

When adjustable conveyor bed 10 is extended, the outer sections 12a, 12e move outwardly from center section 12c so that adjusting rollers 18 approach fixed rollers 20, as can be seen with reference to FIG. 2. As outer sections 12a, 12e move outwardly, upper end rollers 16a correspondingly move outwardly to extend the conveying surface 14a, while adjusting rollers 18 correspondingly move outwardly with outer sections 12a, 12e and toward fixed rollers 20. As can be seen with reference to FIGS. 1 and 2, the adjusting rollers 18 move toward fixed rollers 20 to shorten the distance (and associated length of the section of the conveyor belt) between them. This change or decrease in distance corresponds to the increase in the length of the conveying surface 14a during extension of one or both ends of the conveyor bed. Accordingly, as the outer sections 12a, 12e and rollers 16a, 18 move outwardly (and as may be controlled by adjusting devices 22), the conveying surface 14a increases in length, while the belt routing path around rollers 16, 18, 20 is maintained at generally the same length. The tension in the conveyor belt thus also remains substantially constant throughout the range of adjustment of the adjustable conveyor bed of the present invention.

As the outer or end sections 12a, 12e extend from the center section 12c, the intermediate sections 12b, 12d likewise extend from the center section 12c and may move relative to center section 12c and the respective end sections 12a, 12e to remain positioned generally at a midpoint between the end sections 12a, 12e and center section 12c. The gaps between the end sections 12a, 12e and the respective intermediate sections 12b, 12d thus are approximately equal to the gaps between the intermediate sections 12b, 12d and the center section 12c throughout the range of extension and retraction of the adjustable conveyor bed. The gaps between the sections thus are controlled to limit the size of the gaps as the adjustable conveyor bed is extended, such that additional supports between the sections are not required.

Figure 3:
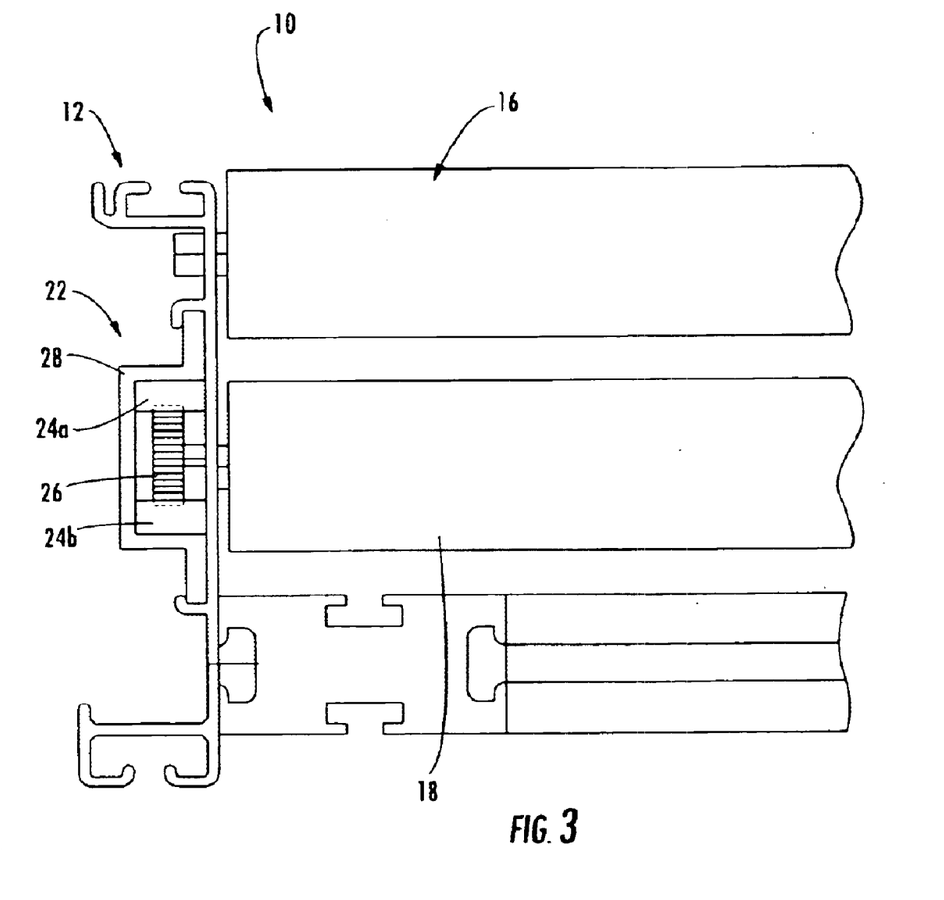
FIG. 3 is a partial sectional view of the adjustable length conveyor bed taken along the line III—III in FIG. 1.

In the illustrated embodiment of FIGS. 1–3, adjusting mechanisms or devices 22 comprise a rack and pinion type arrangement at each end of center section 12c at each sidewall of the adjustable conveyor bed. Each adjusting device 22 includes an upper track 24a, which is mounted to a respective outer section 12a, 12e and extends therefrom toward center section 12c, and a lower track 24b, which is mounted to center section 12c and extends outwardly therefrom toward a respective outer section 12a, 12e. Lower track 24b may comprise a single track extending outwardly from both ends of center section 12c, or may comprise separate tracks mounted at the center section 12c and extending outwardly from the respective ends of the center section, without affecting the scope of the present invention. Each adjusting device 22 also includes a rotatable member 26 rotatably mounted at a respective one of the intermediate sections 12b, 12d and between and in rolling contact with upper and lower tracks 24a, 24b (as best shown in FIG. 3). Preferably, rotatable member 26 includes a plurality of teeth or the like for engaging correspondingly shaped teeth or ridges or the like along tracks 24a, 24b to enhance engagement of the rotatable member with the tracks. As shown in FIG. 3, the adjusting devices 22 may be positioned within a protective housing 28, which may substantially encase the adjusting devices 22 to protect the adjusting devices and to prevent items or fingers or the like from being caught between the tracks and/or rotatable members of the adjusting devices when the adjustable conveyor bed is being adjusted.

Accordingly, as outer section 12a and/or 12e is pulled or pushed or otherwise moved relative to center section 12c, upper track 24a moves over and causes rotation of rotatable member 26, which in turn causes a corresponding movement of lower track 24b relative to rotatable member and section 12b and/or 12d. As can be seen in FIG. 2, intermediate sections 12b, 12d move outwardly from center section 12c, while outer sections 12a, 12e move outwardly from intermediate sections 12b, 12d approximately the same distance. The outer sections 12a, 12e and the intermediate sections 12b, 12d are thus moved outwardly from center section 12c in a controlled manner via adjusting devices 22.

By moving the sections apart in this manner, the adjustable conveyor bed of the present invention may provide a substantial increase in the overall length of the conveying surface, while maintaining small gaps between each pair of adjacent adjustable sections. For example, the conveyor bed and conveying surface may be increased by approximately 10 inches (254 cm), while the gaps between the adjacent sections are correspondingly increased by only 2.5 inches (63.5 cm) each. The present invention thus provides for a substantial increase in the overall length of the conveying surface without requiring additional slider beds or the like positioned between the movable and center sections. Also, the adjustable conveyor bed of the present invention may be easily adjusted to the desired length by pulling or pushing at one or both ends of the conveyor bed until the conveying bed and conveying surface are at the desired length.

When the conveyor bed is extended to a desirable degree of extension, the end or outer sections 12a, 12e and/or the intermediate sections 12b, 12d may be secured in place relative to the fixed or center section 12c to secure the adjustable conveyor bed 10 at the desired extension. For example, one or more of the movable sections 12a, 12b, 12d, 12e may be securable to the fixed roller support 21 to limit or substantially preclude movement of the movable sections relative to the center section (such as in the manner described below with respect to adjustable conveyor bed 10' of FIGS. 4–7). Optionally, the rotatable member may be lockable or securable to limit movement of the sections by limiting movement of the tracks relative to the rotatable member, without affecting the scope of the present invention. Optionally, other locking means may be implemented to lock or secure or retain the movable sections relative to the center or fixed section of the adjustable conveyor bed.

As discussed above, the adjustable conveyor bed of the present invention may include a motorized roller 17 that is operable to drive the continuous belt 14 around the rollers 16, 17, 18 and 20. Motorized roller 17 may comprise any type of internal motor or power source for rotatably driving the roller portion of the roller relative to the non-rotatable portion of the roller. For example, motorized roller 17 may be of the type commercially available from various sources, such as a 12-volt DC or 24-volt DC motorized roller or the like. Optionally, the motorized roller may comprise a DC powered motorized roller, such as a 12-volt DC motorized roller or the like, such as a roller of the type disclosed in U.S. Pat. No. 6,244,427, the disclosure of which is hereby incorporated herein by reference. Optionally, the motorized roller may comprise a 24-volt DC motorized roller or a 42-volt DC motorized roller or a 48 volt DC motorized roller or the like. For example, the motorized roller may comprise a 48 volt DC motorized roller having a diameter of approximately 50 mm and an overall width of between 450 mm and 900 mm, or any other desired width to span the gap between the sidewalls. The 48-volt DC motorized roller may comprise a DC brushless motor and may be operable, for example, at speeds between approximately 130 rpm and 1,150 rpm, and may provide an output of approximately 3 Nm of torque at approximately 400 rpm and approximately 1.5 Nm of torque at approximately 1,150 rpm. It is further envisioned that the motorized roller may comprise other DC powered motorized rollers, or may comprise an AC powered motorized roller, such as described in U.S. Pat. No. 5,442,248, the disclosure of which is hereby incorporated herein by reference, without affecting the scope of the present invention. The internal motor of the motorized roller may drive the roller portion directly, such as disclosed in U.S. Pat. No. 6,244,427, or may drive the roller via a gear train or the like, such as disclosed in U.S. Pat. No. 5,442,248, the disclosures of which are hereby incorporated herein by reference.

The motorized roller 17 thus is operable to drive the continuous conveyor belt 14 which moves along the other idler rollers or pulleys 16, 18, 20, which freely rotate about their shaft portions to guide and support the belt 14 around the adjustable conveyor bed 10. The idler rollers may be any type of rollers, such as conventional, freely rotating rollers, such as the types also commercially available from various sources. The shafts of the idler rollers may be mounted within correspondingly formed holes or apertures in the sidewalls of the adjustable conveyor bed or in the fixed roller support or other bracketry at the adjustable conveyor bed to limit or substantially preclude rotation of the shafts when the roller portions of the idler rollers are rotated due to the driving of the belt via activation of the motorized roller. Although shown as having multiple idler rollers at and along each of the sections 12a–12e, one or more sections of the adjustable conveyor bed of the present invention may include one or more support plates or slider beds to support the belt 14 between the ends of the adjustable conveyor bed, without affecting the scope of the present invention.

Referring now to FIGS. 4–7, an adjustable conveyor bed 10' includes a center or fixed section 12c' and end or outer sections 12a', 12e', with intermediate sections 12b', 12d' movably positioned between end sections 12a', 12e' and the opposite ends of center section 12c', similar to the sections of adjustable conveyor bed 10, discussed above. Adjustable conveyor bed 10' is substantially similar to adjustable conveyor bed 10, discussed above, such that a detailed discussion of the adjustable conveyor bed will not be repeated herein. Suffice it to say that each of the sections 12a', 12b', 12c', 12d', 12e' includes a belt support or roller or upper roller 16' positioned at and along an upper portion of the sidewalls 12' of the sections 12a'–12e' for supporting an upper run or conveying surface 14a' of a continuous conveyor belt 14'. As discussed above, one of the rollers, such as an upper end roller, may comprise a motorized roller 17 that may be activated and deactivated and controlled by a control 19.

Adjustable conveyor bed 10' includes an adjustment mechanism 22' for controlling extension and retraction of the outer sections 12a', 12e' and intermediate sections 12b', 12d' relative to one another and relative to center section 12c'. In the illustrated embodiment, adjustment mechanism or device 22' includes an upper track 24a' and a lower track 24b' at center section 12c' and at a respective end section 12a', 12e', and a rotatable member 26' at the respective intermediate section 12b', 12d', similar to adjustment device 22, described above. Rotatable member 26' may be a toothed gear or sprocket wheel and may engage correspondingly toothed tracks 24a', 24b' to control the movement of the end sections 12a', 12e' relative to the intermediate sections 12b', 12d' and the movement of the intermediate sections 12b', 12d' relative to the center section 12c', as also described above.

Adjustable conveyor bed 10' also includes a fixed roller support 21' that is mounted to center section 12c' and extends in opposite directions therefrom and rotatably mounts a pair of fixed rollers 20' at opposite end portions 21a' of roller support 21'. The end sections 12a', 12e' include guide rollers or movable rollers 18' that are movable with end sections 12a', 12e' relative to center section 12c' and fixed rollers 20' to maintain the overall length of the belt routing path as the upper run or conveying surface 14a of the belt 14 is adjusted via extension and retraction of the movable sections 12a', 12b', 12d' 12e' relative to center section 12c', as discussed above with respect to adjustable conveyor bed 10. The end portions 21a' may mount the fixed rollers 20' at a position generally above the ends of the roller support 21', such that the fixed rollers 20' are generally at or near the level of the movable rollers 18', as can be seen with reference to FIG. 6. In the illustrated embodiment, the roller support 21' is positioned within the sidewalls of the conveyor bed, and provides a roller mounting bracket 18a' for mounting roller 18' at the end portions 21a' of the roller support 21'.

Adjustable conveyor bed 10' is configured to facilitate locking of the movable sections 12a', 12b', 12d', 12e' relative to one another and relative to center section 12c' to substantially lock the adjustable conveyor bed 10' at the desired length or degree of extension. In the illustrated embodiment of FIGS. 4–7, roller support 21' includes a channel 21b' extending at least partially therealong, while one or more of the movable sections 12a', 12b', 12d', 12e' includes a locking member or fastener 23' or the like (optionally, each of the movable sections may include a locking member 23'). Locking member 23' is configured to slide along channel 21b' during adjustment of the adjustable conveyor bed 10', and may be tightened or secured or adjusted within the channel 21b' to limit or substantially preclude movement of the movable sections 12a', 12b', 12d', 12e' relative to roller support 21' and thus, relative to center section 12c'. For example, locking member 23' may comprise a T-nut and bolt configuration or the like, whereby a bolt 23a' may extend through the sidewall of the respective movable section and engage a T-nut or the like 23b' that is slidable along the channel 21b'. The bolt may be tightened to pull the T-nut into tight engagement with the walls of the channel to substantially secure the sidewall relative to the roller support. The locking member 23' may be loosened or adjusted to allow movement of locking member 23' or T-nut along channel 21b' to allow further adjustment of the movable sections 12a', 12b', 12d', 12e' relative to roller support 21' and center section 12c'. Other means for locking or securing the movable sections relative to the roller support and/or the center section may be implemented without affecting the scope of the present invention.

Figure 4:
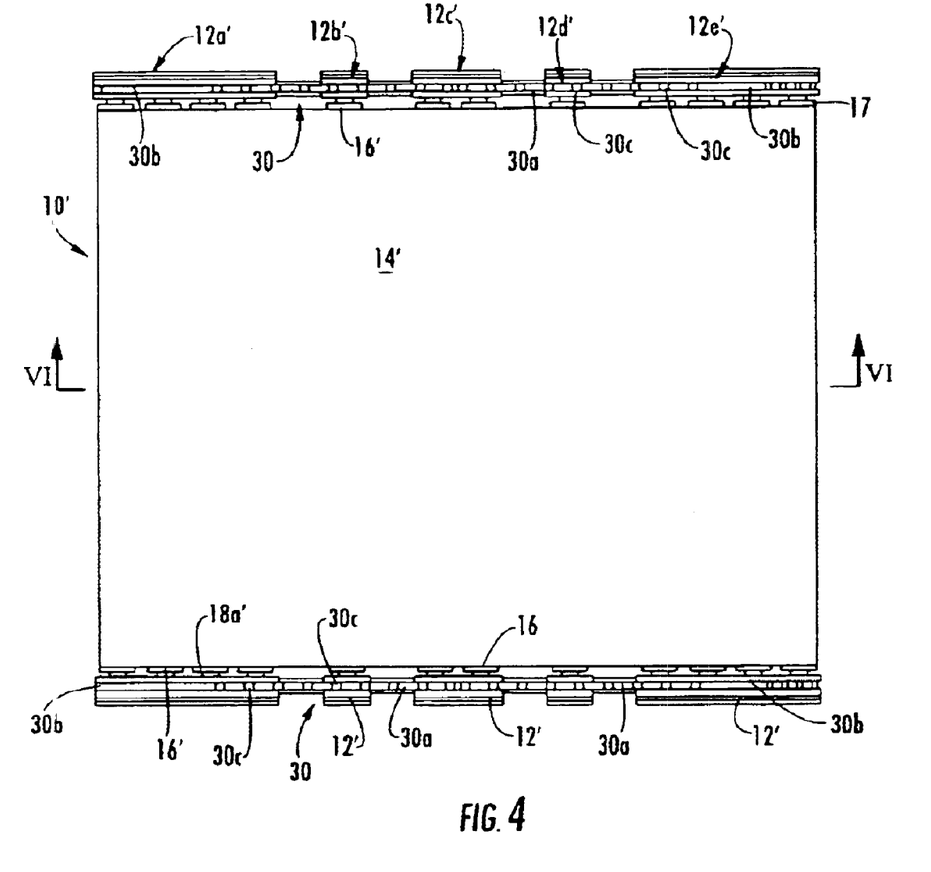
FIG. 4 is a plan view of another adjustable length conveyor bed in accordance with the present invention, shown in its extended state.

Optionally, adjustable conveyor bed 10' may include a second or alternate locking mechanism 30 for locking or securing the movable sections 12a', 12b', 12d', 12e' relative to one another and relative to fixed or center section 12c'. Locking mechanism 30 may comprise an elongated member or bar or rod 30a that is slidably positioned at least partially in and along a channel 30b (FIGS. 4 and 7) formed along sidewalls 12' of the sections 12a'–12e' of adjustable conveyor bed 10'. The elongated member 30a may be substantially secured or attached to fixed or center section 12c' and may be slidable along and securable to the movable sections 12a' and 12b', 12d', 12e'. As can be seen in FIG. 4, the elongated member or members 30a may be secured relative to the channels 30b via one or more fasteners 30c. The fasteners may extend through the elongated member and further through a desired or corresponding opening in the channel wall (such as one or more openings of a plurality of openings along the channel) to lock the member in place relative to the sidewalls. Optionally, the fastener or set screw may be threaded through a threaded opening in the member, whereby tightening the fastener through the opening engages the fastener with a lower wall of the channel and may press the elongated member against the opposite upper wall of the channel to substantially retain the elongated member within the channel and to limit or substantially preclude sliding movement of the sidewalls along the elongated member or members. Other means for retaining the elongated member or rod or bar within a channel or the like along the sidewalls may be implemented to lock or secure the adjustable conveyor bed at the desired length or degree of extension, without affecting the scope of the present invention.

Figure 5:
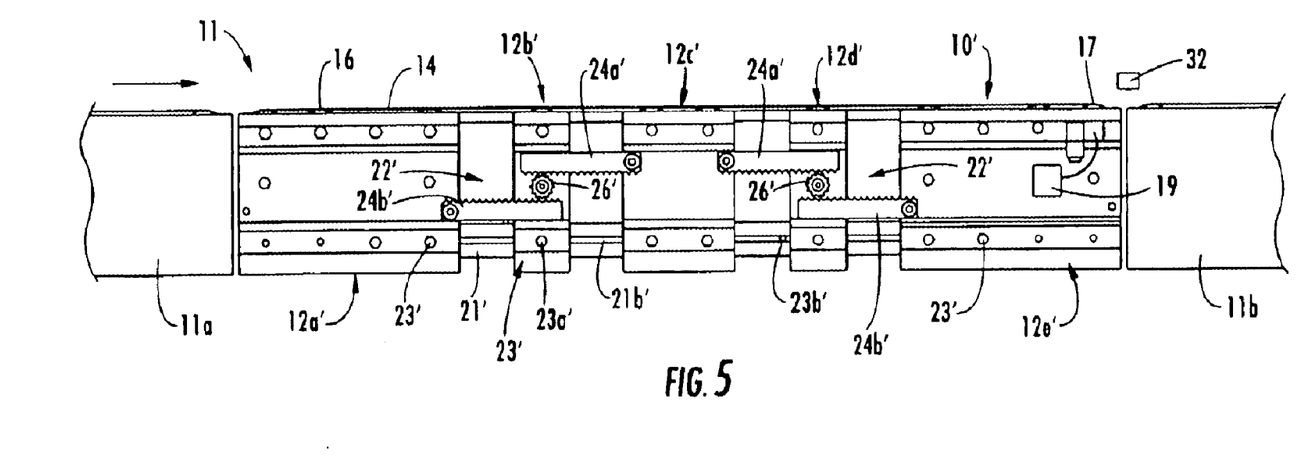
FIG. 5 is a side elevation of the adjustable length conveyor bed of FIG. 4.
Figure 6:
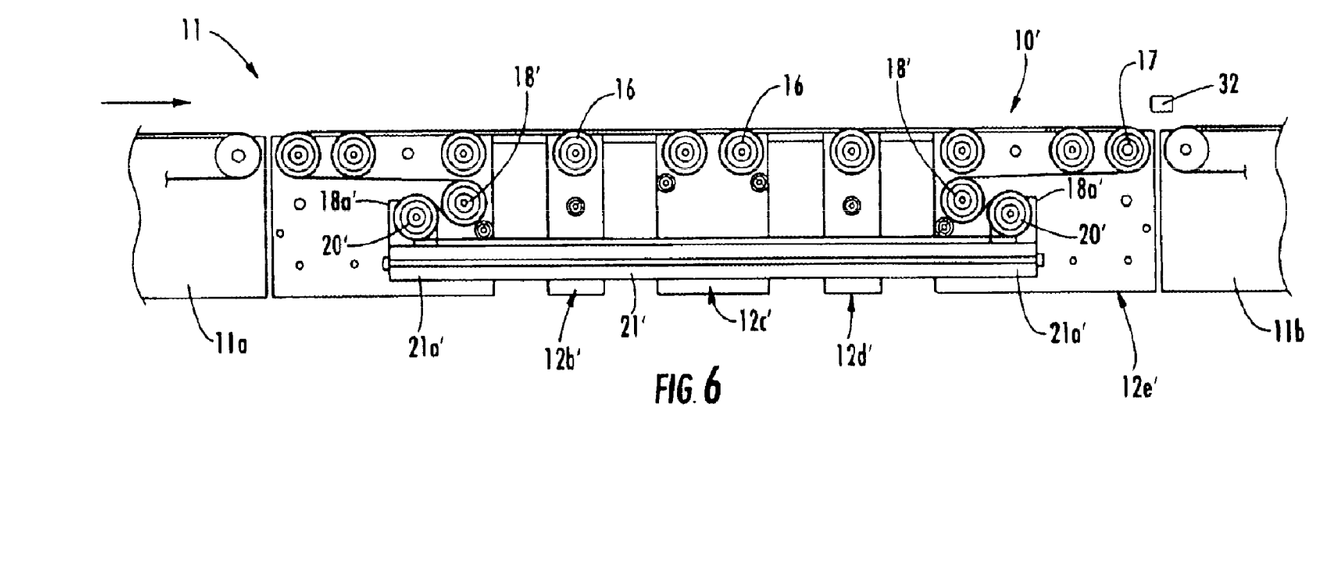
FIG. 6 is a sectional view of the adjustable length conveyor bed taken along the line VI—VI in FIG. 4.
Figure 7:
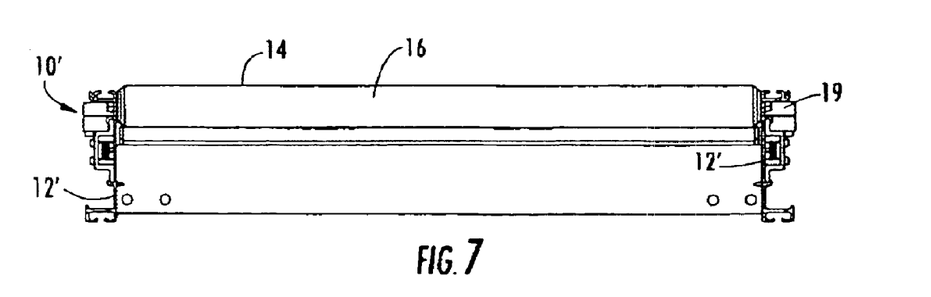
FIG. 7 is an end elevation of the adjustable length conveyor bed of FIGS. 4–6.

Adjustable conveyor bed 10' may be positioned between an upstream and downstream conveyor or conveyor section 11a, 11b and may be part of a transport conveyor system 11 (FIGS. 5 and 6). The conveyor system may be selectively operable to convey articles from the upstream conveyor 11a onto the adjustable conveyor bed 10' and further onto the downstream conveyor 11b. The adjustable conveyor bed may also include one or more article or product sensors 32, such as photo sensors or photo eyes or the like, positioned at the conveyor bed and operable to detect articles being conveyed along the conveyor bed. Control 19 may be included to control and activate and deactivate the internal motor of the motorized or driven roller 17 in response to the product sensor or sensors at the adjustable conveyor bed and/or at the upstream or downstream conveyors. The products sensors may be any type of sensor, such as a sensor of the types disclosed in U.S. Pat. Nos. 5,582,286 and 6,253,909, and/or U.S. provisional application Ser. No. 60/412,396, filed Sep. 20, 2002 by Haan et al., for CONVEYOR SYSTEM REVERSE SLUG ACCUMULATION, which are hereby incorporated herein by reference.

It is envisioned that the adjustable conveyor bed may be positioned between zones of a conveyor system and may comprise a zone of the conveyor system. For example, the adjustable conveyor bed may utilize the principles described in U.S. patent application, Ser. No. 10/358,690, filed Feb. 5, 2003 by Cotter et al. for BELT CONVEYOR, now U.S. Pat. No. 6,811,018, which is hereby incorporated herein by reference. The product sensor may comprise a photo sensor positioned at the downstream end of the adjustable conveyor bed and operable to detect products or articles as they move from the downstream end of the bed to the downstream conveyor. The motorized or self-driven roller 17 may be selectively activated or deactivated by control 19 in response to one or more product sensors 32 positioned along the conveyor system, to move or stop an article or articles that is/are present on the belt of the upstream or downstream conveyors or of the adjustable conveyor bed. The motorized roller thus may be directly driven and operable to selectively and independently convey or accumulate one or more articles on the adjustable conveyor bed in response to one or more product sensors. Optionally, the motorized or self-driven rollers and associated zones may be operable in a "sleep mode", such as described in U.S. Pat. Nos. 5,582,268 and 6,253,909, the disclosures of which are hereby incorporated herein by reference.

The adjustable conveyor bed of the present invention thus may be fixedly mounted or positioned between two adjacent and spaced apart conveyor sections or zones of a conveyor or conveyor system, and may be adjusted in length to generally abut the opposed ends of the spaced apart conveyor sections or zones. Because the adjustable conveyor bed is fixedly or substantially permanently installed as part of the transport conveyor system, the adjustable conveyor bed may comprise a zone of the transport conveyor system or may otherwise function to convey and/or accumulate articles on the adjustable conveying surface as the articles are conveyed from an upstream conveyor section onto the adjustable conveyor bed and further onto a downstream conveyor section of the conveyor system. During installation of the conveyor system, the adjustable conveyor bed may be fixedly positioned between the spaced apart conveyor sections and extended to the desired length between the sections, whereby the adjustable conveyor bed may be substantially secured or locked in place at the desired degree of extension.

Referring now to FIGS. 8–11, an adjustable conveyor section or bed 110 is positionable between spaced apart conveyors or conveying sections (not shown in FIGS. 8–11) of a transport system for transporting articles along the conveying sections. Adjustable conveyor bed 110 is substantially similar to adjustable conveyor bed 10, 10', discussed above, such that a detailed discussion of their common or substantially similar components will not be repeated herein. Suffice it to say that adjustable conveyor bed 110 includes opposite sidewalls 112 with multiple movable sections 112a, 112b, 112d, 112e, which are movable relative to a center section 112c and relative to one another. Adjustable conveyor bed 110 also includes a continuous conveyor belt 114 reeved around a plurality of upper rollers 116, a pair of adjusting rollers 118 and a pair of fixed rollers 120. Adjustable conveyor bed 110 may be adjustable between a retracted state (FIG. 8) and an extended state (FIG. 9) to adjust a length of a belt conveying surface or upper run 114a of belt 114 of adjustable conveyor bed 110 to adapt the length of the conveyor bed to correspond to the gap between the spaced apart conveying sections of the transport system. The adjusting rollers 118 and fixed rollers 120 cooperate to adjust the length of the belt routing path of continuous belt 114 as the sidewalls 112 and conveying surface 114a are extended or retracted, in a similar manner as discussed above. An adjusting mechanism or device 122 is positioned along adjustable conveyor bed 110 and operable to control extension and retraction of the conveyor sections 112a, 112b, 112d, 112e relative to center section 112c and to one another, as discussed below.

Adjusting device 122 comprises a plurality of linkages 124 pivotally mounted to sidewalls 112 and to one another to form a parallelogram arrangement of linkages 124. More particularly, linkages 124 of each adjusting device 122 comprise a pair of center linkages 124a pivotally mounted at a respective inner movable section or intermediate section 112b, 112d, a pair of outer linkages 124b pivotally mounted at one end to center linkages 124a and at the other end to the respective outer section 112a, 112e, and a pair of inner linkages 124c pivotally mounted at one end to center linkages 124a and at the other end to center section 112c.

Figures 8, 9:
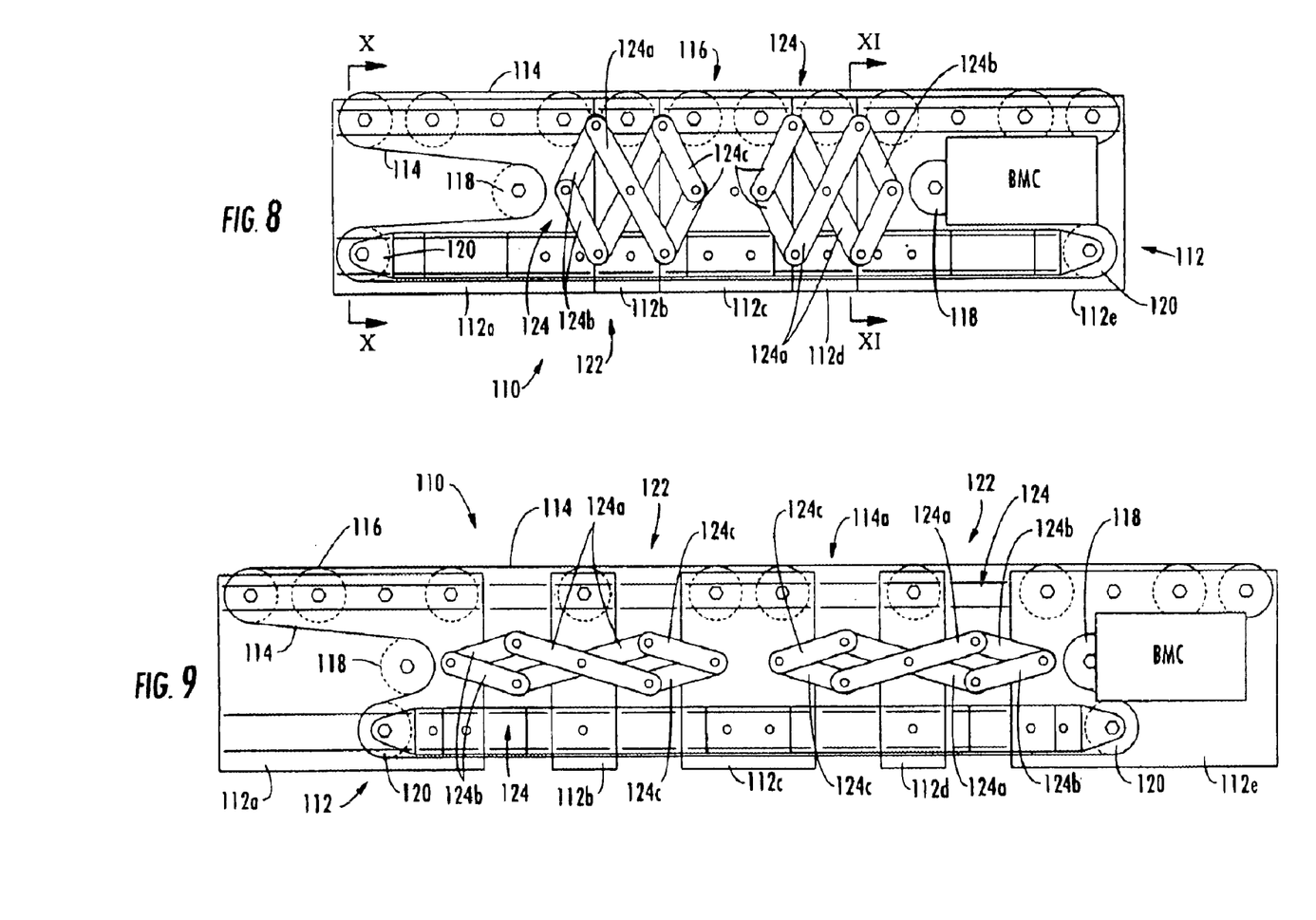
FIG. 8 is a side elevation of another adjustable length conveyor bed in accordance with the present invention, shown in its retracted state.
FIG. 9 is a side elevation of the adjustable length conveyor bed of FIG. 8, shown in its extended state.
Figure 10:
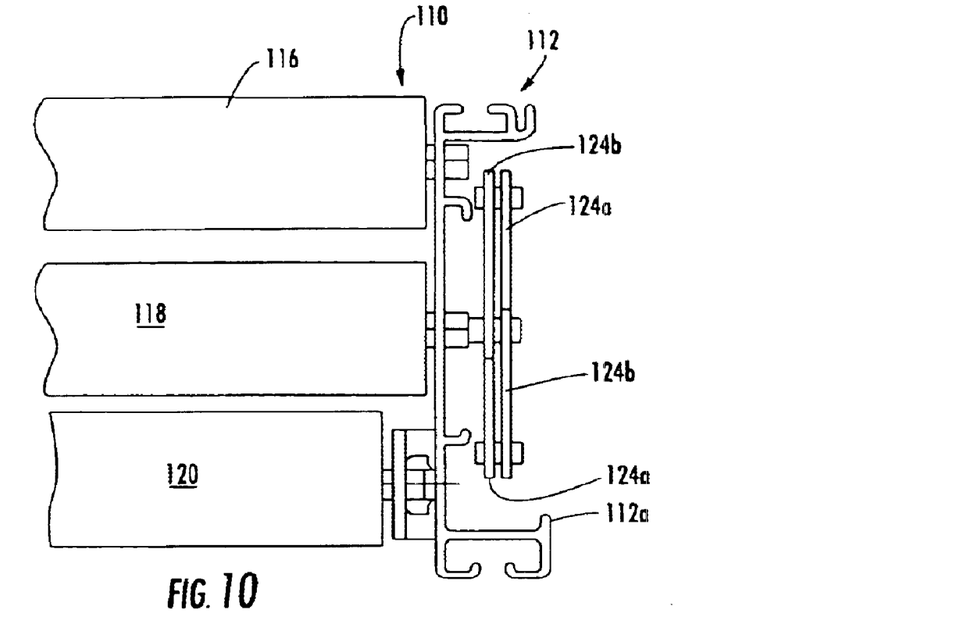
FIG. 10 is a partial sectional view of the adjustable length conveyor bed taken along the line X—X in FIG. 8.
Figure 11:
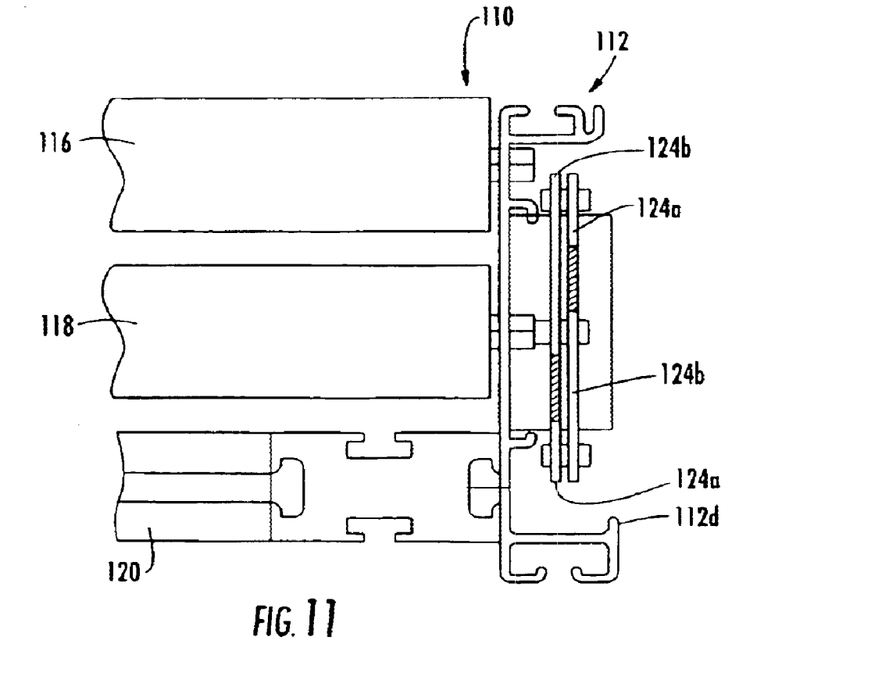
FIG. 11 is a partial sectional view of the adjustable length conveyor bed taken along the line XI—XI in FIG. 8.

Accordingly, as outer section 112a and/or 112e is pulled or pushed or otherwise moved relative to center section 112c, outer section 112a, 112e pulls at center linkages 124a via outer linkages 124b, whereby center linkages 124a pivot to push outwardly from center section 112c via inner linkages 124c. As can be seen in FIG. 9, intermediate sections 112b, 112d thus move outwardly from center section 112c, while outer sections 112a, 112e move outwardly from intermediate sections 112b, 112d approximately the same distance. The outer sections 112a, 112e and the intermediate sections 112b, 112d are thus moved outwardly from center section 112c in a controlled manner via adjusting devices 122, similar to the controlled movement of the sections of adjustable conveyor bed 10, 10' discussed above.

Also similar to the adjustable conveyor bed 10, 10' discussed above, the movable sections 112a, 112b, 112d, 112e of adjustable conveyor bed 110 may be substantially locked or secured relative to fixed or center section 112c to substantially lock or secure the adjustable conveyor bed at the desired degree of extension. The movable sections may be locked or secured via fasteners or the like engaging a channel along the fixed roller support or other channels or members along the sidewalls of the conveyor bed or via any other means, without affecting the scope of the present invention.

Although shown and described as having multiple upper rollers positioned along each section of the adjustable conveyor bed, the adjustable sections may have other forms of belt supports positioned therealong or at one or both ends thereof, without affecting the scope of the present invention. For example, the center section may include a belt support at each end, while each intermediate extendable or movable section may include one or more belt supports, depending on the length of the section, and each outer or end extendable or movable section may include a belt support at the end adjacent to the respective intermediate section. The belt supports may comprise rollers or slider bed sections or the like, without affecting the scope of the present invention. Because each section of the adjustable conveyor bed includes one or more belt supports, and because the gaps between adjacent sections are controlled to be substantially similar to one another and thus are minimized, the present invention provides an adjustable conveyor bed which may extend a substantial amount while minimizing the gap or distance between the adjacent supports for the conveying belt.

Therefore, the present invention provides an adjustable conveyor bed which may be positioned between separated or spaced apart conveyors or conveyor sections or the like of a transport conveyor system, and may be adjusted in length to substantially abut the separated conveyors to provide a generally continuous conveying surface along and between the conveyors. The adjustable conveyor bed adjusts the overall length of a belt conveying surface of the section, while substantially maintaining the overall length of the belt routing path around the rollers of the adjustable conveyor bed. The movement of the sections of the adjustable conveyor bed is controlled to provide multiple similar gaps between the sections as they are extended, in order to minimize the length of such gaps to avoid the need for an additional slider bed or other support between the extended and separated sections of the adjustable conveyor bed. The movable sections of the adjustable conveyor bed may be locked or secured relative to the fixed section of the adjustable conveyor bed to substantially fix the adjustable conveyor bed at the desired degree of extension. The adjustable conveyor bed of the present invention thus may accommodate different sized gaps between conveyor sections and thus may avoid the need for manufacturing different conveyor beds to accommodate specified distances between conveyor sections.

Changes and modifications in the specifically described embodiments may be carried out without departing from the principles of the present invention, which is intended to be limited only by the scope of the appended claims, as interpreted according to the principles of patent law.

The embodiments of the invention in which an exclusive property or privilege is claimed are defined as follows:

1. An adjustable length conveyor bed positionable between spaced apart conveyor sections of a transport conveyor of a warehouse, said adjustable length conveyor bed being adjustable to adjust a length of said conveyor bed to substantially span a distance between the spaced apart conveyor sections, said adjustable length conveyor bed comprising:

first and second sections movably positioned relative to one another, each of said first and second sections having opposite sidewalls, each of said first and second sections including at least one support roller at an upper portion of said sidewalls;

a fixed roller support fixedly mounted to said first section and having an end portion that extends from said first section and toward said second section, said fixed roller support having a fixed roller rotatably mounted at said end portion;

a guide roller mounted at said sidewalls of said second section and movable with said second section relative to said first section and said fixed roller, said support rollers, said fixed roller and said guide roller defining a belt routing path;

a continuous belt reeved around said support rollers, said fixed roller and said guide roller and along said belt routine path, an upper run of said belt defining a conveying surface at said support rollers and along said adjustable length conveyor bed, said guide roller being movable with said second section and relative to said fixed roller to maintain a generally constant tension in said belt as said second section is moved relative to said first section, said second section being movable relative to said first section and being securable at a desired degree of extension from said first section by securing said sidewall of said second section relative to said fixed roller support; and an adjustment mechanism configured to adjust said second section relative to said first section to adjust a length of said conveying surface while maintaining an overall length of said belt routing path, wherein said adjustment mechanism comprises a track extending from one of said first and section sections and a rotatable member at the other of said first and second sections, said rotatable member engaging said track and controlling movement of said track via rotation of said rotatable member.

2. An adjustable length conveyor bed positionable between spaced apart conveyor sections of a transport conveyor of a warehouse, said adjustable length conveyor bed being adjustable to adjust a length of said conveyor bed to substantially span a distance between the spaced apart conveyor sections, said adjustable length conveyor bed comprising:

first and second sections movably positioned relative to one another, each of said first and second sections having opposite sidewalls, each of said first and second sections including at least one support roller at an upper portion of said sidewalls;

a fixed roller support fixedly mounted to said first section and having an end portion that extends from said first section and toward said second section, said fixed roller support having a fixed roller rotatably mounted at said end portion;

a guide roller mounted at said sidewalls of said second section and movable with said second section relative to said first section and said fixed roller, said support rollers, said fixed roller and said guide roller defining a belt routing path;

a continuous belt reeved around said support rollers, said fixed roller and said guide roller and along said belt routing path, an upper run of said belt defining a conveying surface at said support rollers and along said adjustable length conveyor bed, said guide roller being movable with said second section and relative to said fixed roller to maintain a generally constant tension in said belt as said second section is moved relative to said first section, said second section being movable relative to said first section and being securable at a desired degree of extension from said first section by securing said sidewall of said second section relative to said fixed roller support; and an adjustment mechanism configured to adjust said second section relative to said first section to adjust a length of said conveying surface while maintaining an overall length of said belt routing path, wherein said adjustment mechanism comprises first and second pairs of linkages pivotally mounted to the sidewalls of said first and second sections, said first pair of linkages being pivotally connected to said second pair of linkages, said pairs of linkages defining a parallelogram assembly with pivots at said first and second sections.

3. An adjustable length conveyor bed positionable between spaced apart conveyor sections of a transport conveyor of a warehouse, said adjustable length conveyor bed being adjustable to adjust a length of said conveyor bed to substantially span a distance between the spaced apart conveyor sections, said adjustable length conveyor bed comprising:

first and second sections movably positioned relative to one another, each of said first and second sections having opposite sidewalls, each of said first and second sections including at least one support roller at an upper portion of said sidewalls;

a fixed roller support fixedly mounted to said first section and having an end portion that extends from said first section and toward said second section, said fixed roller support having a fixed roller rotatably mounted at said end portion;

a guide roller mounted at said sidewalls of said second section and movable with said second section relative to said first section and said fixed roller, said support rollers, said fixed roller and said guide roller defining a belt routing path;

a continuous belt reeved around said support rollers, said fixed roller and said guide roller and along said belt routing path, an upper run of said belt defining a conveying surface at said support rollers and along said adjustable length conveyor bed, said guide roller being movable with said second section and relative to said fixed roller to maintain a generally constant tension in said belt as said second section is moved relative to said first section, said second section being movable relative to said first section and being securable at a desired degree of extension from said first section by securing said sidewall of said second section relative to said fixed roller support; and a third section that is movably positioned relative to said first section, said first section being positioned between said second and third sections, said fixed roller support having a second end portion that extends from said first section and toward said third section, said fixed roller support having a second fixed roller rotatably mounted at said second end portion.

4. An adjustable length conveyor bed positionable between spaced apart conveyor sections of a transport conveyor of a warehouse, said adjustable length conveyor bed being adjustable to adjust a length of said conveyor bed to substantially span a distance between the spaced apart conveyor sections, said adjustable length conveyor bed comprising:

first and second sections movably positioned relative to one another, each of said first and second sections having opposite sidewalls, each of said first and second sections including at least one support roller at an upper portion of said sidewalls;

a fixed roller support fixedly mounted to said first section and having an end portion that extends from said first section and toward said second section, said fixed roller support having a fixed roller rotatably mounted at said end portion;

a guide roller mounted at said sidewalls of said second section and movable with said second section relative to said first section and said fixed roller, said support rollers, said fixed roller and said guide roller defining a belt routing path; and a continuous belt reeved around said support rollers, said fixed roller and said guide roller and along said belt routing path, an upper run of said belt defining a conveying surface at said support rollers and along said adjustable length conveyor bed, said guide roller being movable with said second section and relative to said fixed roller to maintain a generally constant tension in said belt as said second section is moved relative to said first section, said second section being movable relative to said first section and being securable at a desired degree of extension from said first section by securing said sidewall of said second section relative to said fixed roller support, wherein said fixed roller support comprises a channel extending at least partially therealong, said second section including a locking member that is slidable along said channel as said second section is moved relative to said first section, said locking member being securable in said channel to secure said second section relative to said first section.

5. The conveyor bed of claim 4, wherein said fixed roller support comprises opposite support sections fixedly mounted at said opposite sidewalls of said first section, said fixed roller being mounted to said opposite support sections.

6. The conveyor bed of claim 4 including an adjustment mechanism configured to adjust said second section relative to said first section to adjust a length of said conveying surface while maintaining an overall length of said belt routing path.

7. The conveyor bed of claim 4, wherein one of said rollers comprises a motorized roller having an internal motor that is operable to rotatably drive a roller portion of said motorized roller relative to a shaft portion of said motorized roller.

8. An adjustable length conveyor bed positionable between spaced apart conveyor sections of a transport conveyor of a warehouse, said adjustable length conveyor bed being adjustable to adjust a length of said conveyor bed to substantially span a distance between the spaced apart conveyor sections, said adjustable length conveyor bed comprising:

first and second end sections movably positioned at opposite ends of a center section, said first and second end sections being movable relative to one another and relative to said center section, each of said first end section, said second end section and said center section having opposite sidewalls, each of said first and second end sections and said center section including at least one support roller mounted at said sidewalls;

a fixed roller support fixedly mounted to said center section and extending from said opposite ends of said center section, said fixed roller support having first and second fixed rollers rotatably mounted at opposite end portions of said fixed roller support;

a first guide roller mounted at said sidewalls of said first end section and movable with said first end section relative to said center section and said first fixed roller;

a second guide roller mounted at said sidewalls of said second end section and movable with said second end section relative to said center section and said second fixed roller, said support rollers, said fixed rollers and said guide rollers defining a belt routing path; and a continuous belt reeved around said support rollers and said fixed and movable guide rollers and along said belt routing path, an upper run of said belt defining a conveying surface at said support rollers and along said adjustable length conveyor bed, said first and second guide rollers being movable relative to said first and second fixed rollers to maintain a generally constant tension in said belt as said first and second end sections are moved relative to said center section.

9. The conveyor bed of claim 8, wherein said first and second end sections are movable relative to said center section and are securable at a desired degree of extension from said center section by securing said sidewalls of said first and second end sections relative to said fixed roller support.

10. The conveyor bed of claim 9, wherein said fixed roller support comprises a channel extending at least partially therealong, said first and second end sections including a locking member that is slidable along said channel when said first and second end sections are moved relative to said center section, said locking member being securable in said channel to secure said first and second end sections relative to said fixed roller support.

11. The conveyor bed of claim 8 including an adjustment mechanism configured to adjust said first end section relative to said center section and said second end section relative to said center section to adjust the length of said conveying surface.

12. The conveyor bed of claim 11, wherein said adjustment mechanism adjusts said first end section relative to said center section and said second end section relative to said center section such that a gap between said first end section and said center section is substantially equal to a gap between said second end section and said center section.

13. The conveyor bed of claim 11, wherein said adjustment mechanism comprises a rotatable member that is mounted at said center section and a pair of tracks mounted at said end sections, said rotatable member engaging said tracks and being operable to control movement of said tracks and of said first and second end sections relative to said center section via rotation of said rotatable member.

14. The conveyor bed of claim 11, wherein said adjustment mechanism comprises a plurality of linkages, each of said linkages being pivotally connected to at least two other of said linkages, said linkages defining a parallelogram assembly that is pivotally mounted to said first and second end sections and said center section.

15. The conveyor bed of claim 8 including a first intermediate section movably positioned between said first end section and said center section, and including a second intermediate section movably positioned between said second end section and said center section.

16. The conveyor bed of claim 15, wherein said first and second intermediate sections comprise at least one belt support for supporting said upper run of said belt.

17. The conveyor bed of claim 15, wherein said first and second end sections are movable relative to said first and second intermediate sections and said first and second intermediate sections are movable relative to said center section, said first and second end sections and said first and second intermediate sections being securable at a desired degree of extension from said center section by securing at least one of said end and intermediate sections relative to said fixed roller support.

18. The conveyor bed of claim 15, including an adjustment mechanism configured to adjust said first end section and said first intermediate section relative to said center section to adjust a length of said conveying surface while maintaining an overall length of said belt routing path.

19. The conveyor bed of claim 18, wherein said adjustment mechanism adjusts said first end section relative to said first intermediate section and said first intermediate section relative to said center section such that a gap between said first end section and said first intermediate section is substantially equal to a gap between said first intermediate section and said center section.

20. The conveyor bed of claim 8, wherein one of said rollers comprises a motorized roller having an internal motor that is operable to rotatably drive a roller portion of said motorized roller relative to a shaft portion of said motorized roller.

21. An adjustable length conveyor bed positionable between spaced apart conveyor sections of a transport conveyor of a warehouse, said adjustable length conveyor bed being adjustable to adjust a length of said conveyor bed to substantially span a distance between the spaced apart conveyor sections, said adjustable length conveyor bed comprising:

an end section movably positioned at an intermediate section, said intermediate section being movably positioned at an end of a fixed section, said fixed section being fixedly positioned at the warehouse between the spaced apart conveyor sections, each of said end, intermediate and fixed sections including at least one belt support;

a fixed roller support fixedly mounted to said fixed section and extending from said end of said fixed section, said fixed roller support having a fixed roller rotatably mounted at an end portion of said fixed roller support;

a guide roller mounted at said end section and movable with said end section relative to said fixed section and said fixed roller, said belt supports, said fixed roller and said guide roller defining a belt routing path; and a continuous belt reeved around said belt supports, said fixed roller and said guide roller and along said belt routing path, an upper run of said belt defining a conveying surface at said belt supports and along said adjustable length conveyor bed, said guide roller being movable relative to said fixed roller to maintain a generally constant tension in said belt as said end section and said intermediate section are moved relative to said fixed section, said end section and said intermediate section being movable relative to said fixed section and being securable at a desired degree of extension from said fixed section by securing at least one of said end section and said intermediate section relative to said fixed roller support.

22. The conveyor bed of claim 21, wherein said fixed roller support comprises a channel extending at least partially therealong, said at least one of said end section and said intermediate section including a locking member that is slidable along said channel when said end and intermediate sections are moved relative to said fixed section, said locking member being securable in said channel to secure said at least one of said end section and said intermediate section relative to said fixed roller support.

23. The conveyor bed of claim 21 including an adjustment mechanism configured to adjust said end section relative to said intermediate section and said intermediate section relative to said fixed section to adjust a length of said conveying surface while maintaining an overall length of said belt routing path.

24. The conveyor bed of claim 23, wherein said adjustment mechanism adjusts said end section relative to said intermediate section and said intermediate section relative to said fixed section such that a gap between said end section and said intermediate section is substantially equal to a gap between said intermediate section and said fixed section.

25. The conveyor bed of claim 23, wherein said adjustment mechanism comprises a rotatable member that is mounted at said intermediate section, said rotatable member rotatably engaging a pair of tracks, one of said tracks being mounted at said end section and extending therefrom and the other of said tracks being mounted at said fixed section and extending therefrom, said rotatable member engaging said tracks and being operable to control relative movement of said tracks and said rotatable member and to control movement of said end section and said intermediate section relative to said fixed section via rotation of said rotatable member.

26. The conveyor bed of claim 23, wherein said adjustment mechanism comprises a plurality of linkages, each of said linkages being pivotally connected to at least two other of said linkages, said linkages defining a parallelogram assembly with a center pivot positioned at said intermediate section and opposite end pivots positioned at said end section and said fixed section.

27. The conveyor bed of claim 21 including a second end section and a second intermediate section movably positioned at an opposite end of said fixed section and including at least one belt support, said fixed roller support extending from said opposite end of said fixed section and having a second fixed roller rotatably mounted at an opposite end portion of said fixed roller support, said second end section including a second guide roller, said fixed rollers and said guide rollers and said belt supports defining said belt routing path.

28. The conveyor bed of claim 27, wherein said second end section and said second intermediate section are movable relative to said fixed section and are securable at a desired degree of extension from said fixed section by securing at least one of said second end section and said second intermediate section relative to said fixed roller support.

29. The conveyor bed of claim 21, wherein one of said rollers comprises a driven roller operable to drive said continuous belt.

30. The conveyor bed of claim 29, wherein said driven roller comprises a motorized roller having an internal motor that is operable to rotatably drive a roller portion of said motorized roller relative to a shaft portion of said motorized roller.

* * * * *

UNITED STATES PATENT AND TRADEMARK OFFICE
CERTIFICATE OF CORRECTION

| | | |
|---|---|---|
| PATENT NO. | : 6,935,487 B2 | Page 1 of 1 |
| APPLICATION NO. | : 10/704451 | |
| DATED | : August 30, 2005 | |
| INVENTOR(S) | : Frank-Peter Schaum and Michael T. McGettigan | |

It is certified that error appears in the above-identified patent and that said Letters Patent is hereby corrected as shown below:

<u>Column 13:</u>
Line 1, Claim 1, "routine" should be --routing--.

Signed and Sealed this

Twenty-seventh Day of March, 2007

JON W. DUDAS
*Director of the United States Patent and Trademark Office*